United States Patent [19]

Ohkumo

[11] Patent Number: 4,823,644
[45] Date of Patent: Apr. 25, 1989

[54] FAIL SAFE FOR A CONTINUOUSLY VARIABLE TRANSMISSION

[75] Inventor: Hiroya Ohkumo, Koganei, Japan

[73] Assignee: Fuji Jukogyo Kabushiki Kaisha, Tokyo, Japan

[21] Appl. No.: 944,346

[22] Filed: Dec. 19, 1986

[30] Foreign Application Priority Data

Dec. 19, 1985 [JP] Japan .................. 60-286611

[51] Int. Cl.⁴ .............................................. B60K 41/12
[52] U.S. Cl. ......................................... 74/866; 74/867
[58] Field of Search ................. 74/866, 877, 867, 868; 364/424.1

[56] References Cited

U.S. PATENT DOCUMENTS

| | | | |
|---|---|---|---|
| 4,126,061 | 11/1978 | Fry | 74/866 |
| 4,393,732 | 7/1983 | Suzuki et al. | 74/867 X |
| 4,635,508 | 1/1987 | Tatsumi | 74/866 |
| 4,660,440 | 4/1987 | Matsumura et al. | 74/866 |
| 4,663,991 | 5/1987 | Nakamura et al. | 74/868 |

FOREIGN PATENT DOCUMENTS 59-77157  5/1984  Japan .

Primary Examiner—Dwight G. Diehl
Attorney, Agent, or Firm—Martin A. Farber

[57] ABSTRACT

A control system for a motor vehicle provided with a continuously variable transmission. The transmission has a transmission ratio control valve having ports and a spool for controlling the transmission ratio. A throttle position sensor is provided for detecting the load on an engine and for deciding the transmission ratio in accordance with the load. Abnormality of the throttle position sensor is detected by comparing a first load signal immediately after starting of the engine with a subsequent load signal. When difference between the first load signal and the subsequent load signal is smaller than a predetermined value, a fail-safe signal is produced for maintaining the transmission ratio at a moderate value.

11 Claims, 6 Drawing Sheets

FAIL SAFE FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a fail-safe system for a failure of a sensor such as a throttle position sensor of an automotive engine.

A known continuously variable belt-drive transmission for a motor vehicle comprises an endless belt running over a drive pulley and a driven pulley. Each pulley comprises a movable conical disc which is axially moved by a fluid operated servo device so as to vary the running diameter of the belt on the pulley in dependence on driving conditions. The system is provided with a hydraulic circuit including a pump for supplying oil to servo device, and a line pressure control valve and a transmission ratio control valve. Each valve comprises a spool to control the oil supplied to the servo devices.

The transmission ratio control valve operates to set the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

In such a system, if a load detecting sensor such as a throttle position sensor is out of order and operates an erroneous signal, the transmission ratio control valve and the line pressure control valve malfunction due to the erroneous signal. Accordingly, the transmission ratio and line pressure deviate from desired values respectively, which will render the vehicle inoperative.

Japanese Patent Application Laid Open 59-77157 discloses a fail-safe system for a continuously variable transmission. The system is adapted to provide a maximum transmission ratio when an electromagnetic clutch for transmitting the output of the engine to the transmission is disengaged. Accordingly, even if the throttle position sensor fails to sense the load on the engine, the vehicle can be started at the maximum transmission ratio. However, the transmission ratio is not properly controlled after the starting of the vehicle.

On the other hand, the throttle position sensor may malfunction to generate an erroneous signal representing the wide-open throttle or the closed throttle. In case of the wide-open throttle signal, the transmission ratio changes along a line l, of FIG. 5. As seen from the figure, the ratio varies in a high engine speed range. To the contrary, in case of a closed throttle signal, the transmission ratio changes along a line l$_2$ in a low engine speed range. Accordingly, if, for example, the engine is accelerated on an uphill road, the transmission ratio is up-shifted along the line l$_2$ in the low engine speed range. In such a driving condition, since the driving torque of the engine is very low, it is difficult to drive the vehicle.

SUMMARY OF THE INVENTION

The object of the present invention is to provide a fail-safe system which may control the transmission ratio so as to prevent the reduction of the driveability of a vehicle at malfuctioning of a load sensor of an engine.

The system of the present invention includes a throttle position sensor for detecting the load on an engine and for deciding the transmission ratio in accordance with the load. Abnormality of the throttle position sensor is detected by comparing a first load signal immediately after starting of the engine with a subsequent load signal. When the difference between the first load signal and the subsequent load signal is smaller than a predetermined value, a fail-safe signal is produced for maintaining the transmission ratio at a moderate value.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, and a hydraulic circuit having a pump for supplying oil to the first and second cylinders, to the first through the transmission ratio control valve.

The system comprises a sensor for detecting load on the engine and for producing a load signal, first means responsive to the load signal for producing a desired transmission ratio signal, second means responsive to the desired transmission ratio signal for shifting the spool of the transmission ratio control valve so as to provide a transmission ratio, detecting means for detecting abnormality of the sensor and producing a fail-safe signal, third means responsive to the fail-safe signal for correcting the load signal so as to provide a moderate transmission ratio.

The other objects and features of this invention will become understood from the following description with reference to the accompanying drawings.

DETAILED DESCRIPTION OF THE PREFERRED EMBODIMENT

Figure 1:
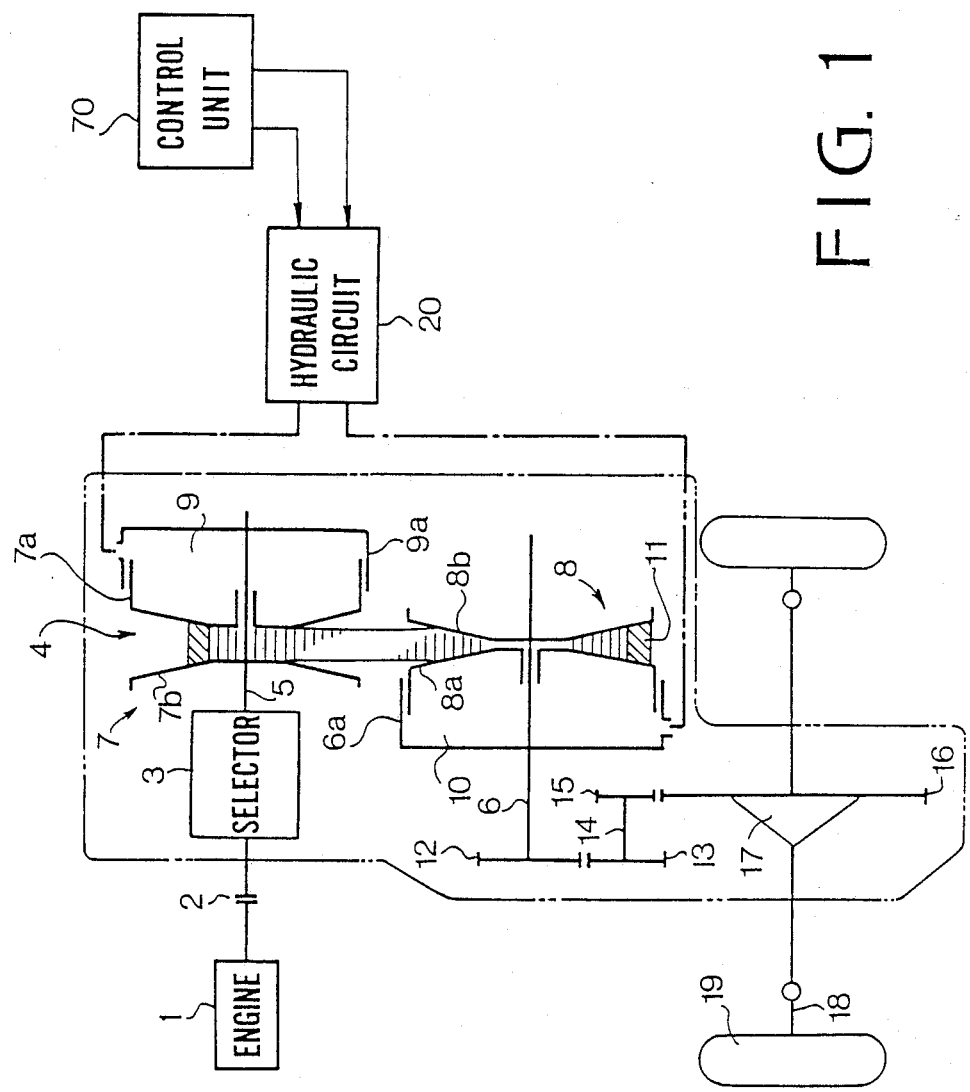
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
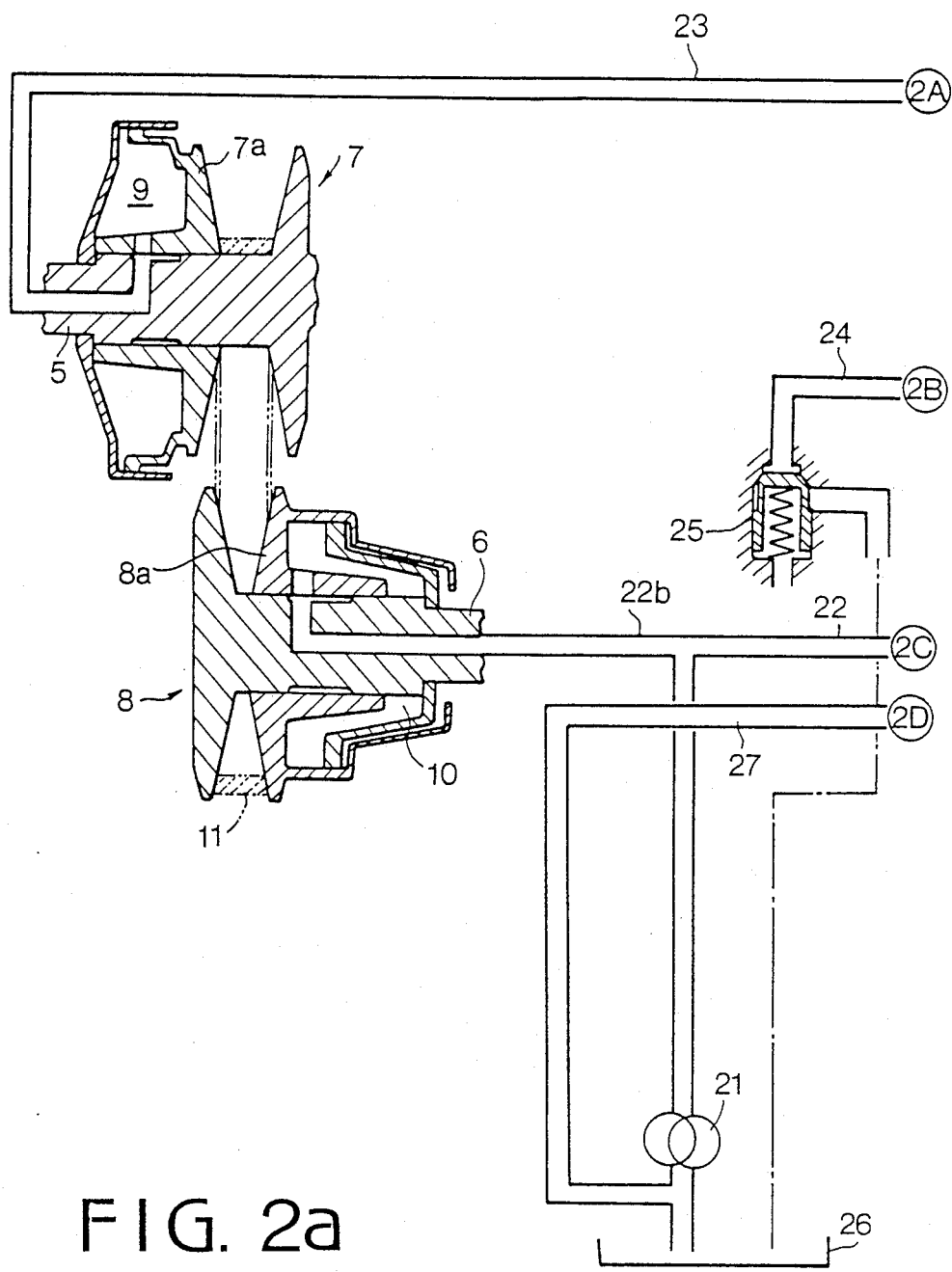
FIGS. 2a and 2b are schematic diagrams showing a control system according to the present invention.
Figure 2B:
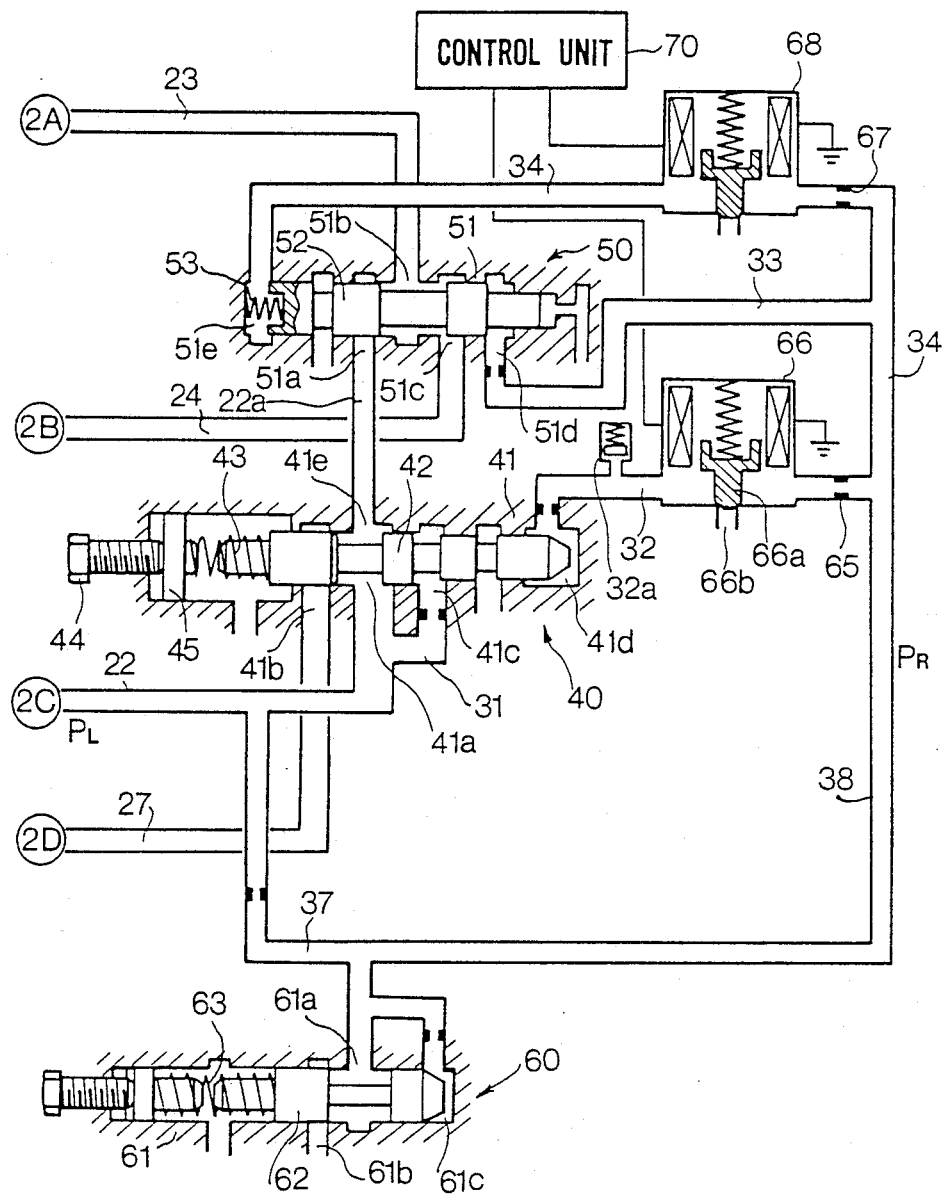

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c, supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through a conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and a passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The control valves 66 and 68 are operated by signals from a control unit 70. Thus, oil pressure controlled by the control valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ration (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
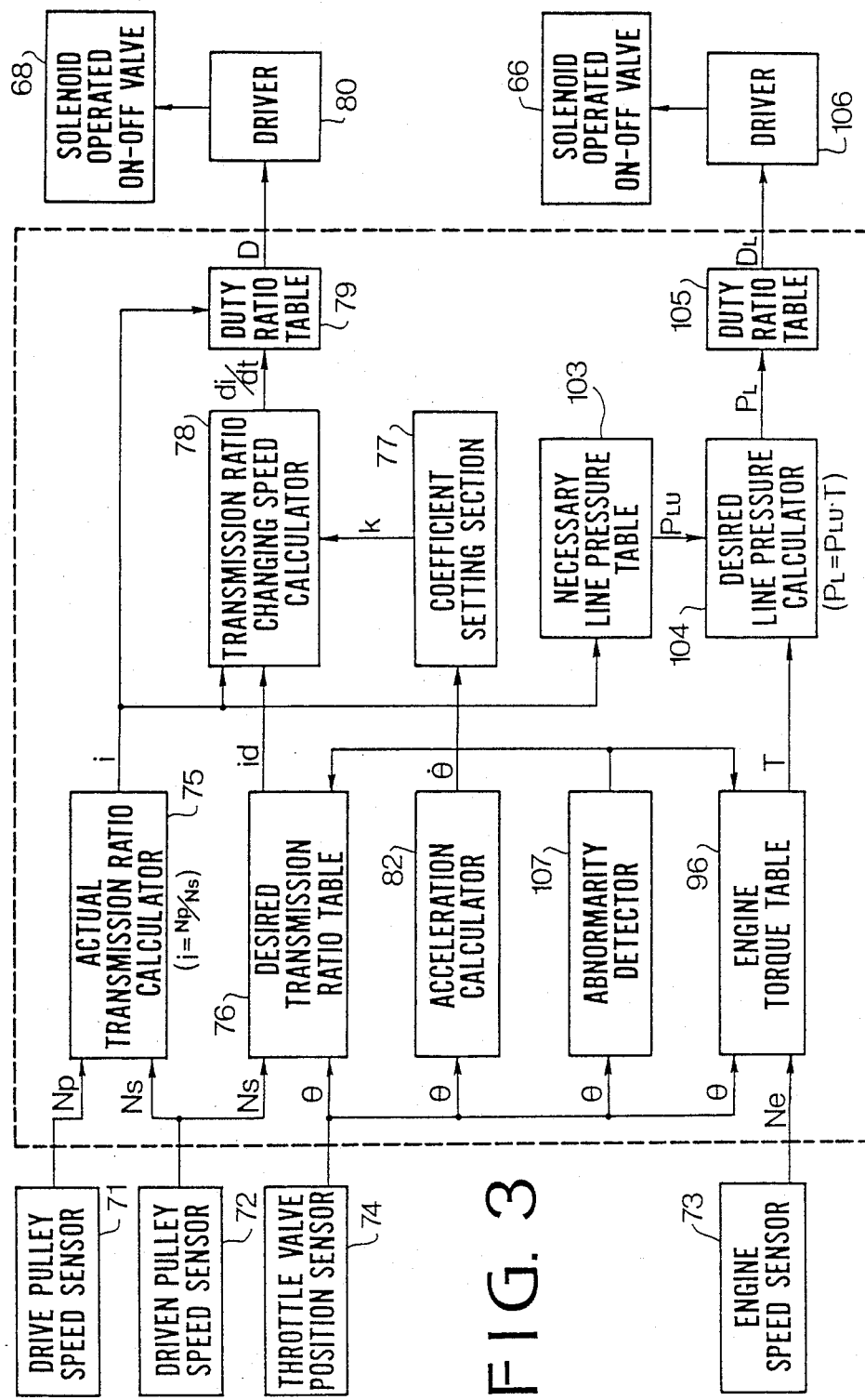
FIG. 3 is a block diagram showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle position sensor 74 are fed to a desired transmission ratio table 76. The desired transmission ratio id is fetched by the table 76 in accordance with the signals $N_s$ and $\theta$. On the other hand, the output signal $\theta$ is fed to an acceleration calculator 82 to obtain acceleration $\dot{\theta}$. The signal of the acceleration $\dot{\theta}$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ration changing speed di/dt from the formula $di/dt = K(id - i)$.

The speed di/dt and actual ratio i are applied to a duty ratio table 79 to derive the duty ratio D. The duty ratio D is supplied to the solenoid operated valve 68 through a driver 80.

Further, the output signal $\theta$ of throttle position sensor 74 and the output $N_e$ of engine speed sensor 73 are fed to an engine torque table 96, so that engine torque T is obtained based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to a the desired line pressure $P_L$. The duty ratio $D_L$ is supplied to a driver 106 which operates the solenoid operated on-off valve 66 at the duty ratio.

In the system of the present invention, the signal $\theta$ of throttle position sensor 74 is supplied to an abnormality detector 107. The detector 107 detects the abnormality of the throttle position sensor 74.

Explaining the detection of the abnormality, immediately after the starting of the engine, an accelerator pedal of the vehicle is not depressed. The output of the throttle position sensor 74 changes when the accelerator pedal is depressed in order to start the vehicle. Accordingly, if the magnitude of output signal does not change at the start of the vehicle, it is determined that the throttle position sensor 74 does not normally operate.

When the abnormality is detected, the detector 107 produces first and second fail-safe throttle position signals. The first fail-safe signal is provided for the desired transmission ratio and set to a predetermined value, for example a value corresponding to 60% of the value $\theta$ at the full throttle open. The second fail-safe signal is provided for the desired line pressure and set to a value corresponding to 100% of a maximum engine torque. The first fail-safe signal is applied to the desired transmission ratio table 76 to produce a predetermined desired transmission ratio signal id, and the second fail-safe signal is fed to the engine torque table 96 to produce a predetermined engine torque signal T.

In operation, while the vehicle is at a stop, chamber 10 of the driven pulley 8 is supplied with line pressure through passage 22b, and the chamber 9 of the drive pulley 7 is drained, since $N_p$, $N_s$, $\theta$ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the drive belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 (FIG. 1) is gradually engaged, transmitting the engine power to the drive pulley 7. The power of the engine is transmitted to the output shaft 6 at the largest transmission ratio by the drive belt 11 and driven pulley 8, and further transmitted to axles 18 of the driving wheels 19. Thus, the vehicle is started.

At that time the line pressure is at the highest value by the pressure control valve 40, since the duty ratio for the valve 66 is large, and the spool 42 of the control valve 40 is at the right end position. When the throttle valve is opened for acceleration, the desired transmission ratio id is fetched by the desired transmission ratio table 76 and transmission ratio changing speed di/dt is calculated by calculator 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, the duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. When the vehicle speed (output signal $N_s$) exceeds a predetermined value, the clutch 2 is entirely engaged.

The control operation of line pressure will be described hereinafter with reference to FIGS. 2a, 2b, 3 and 5. From the engine torque table 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4:
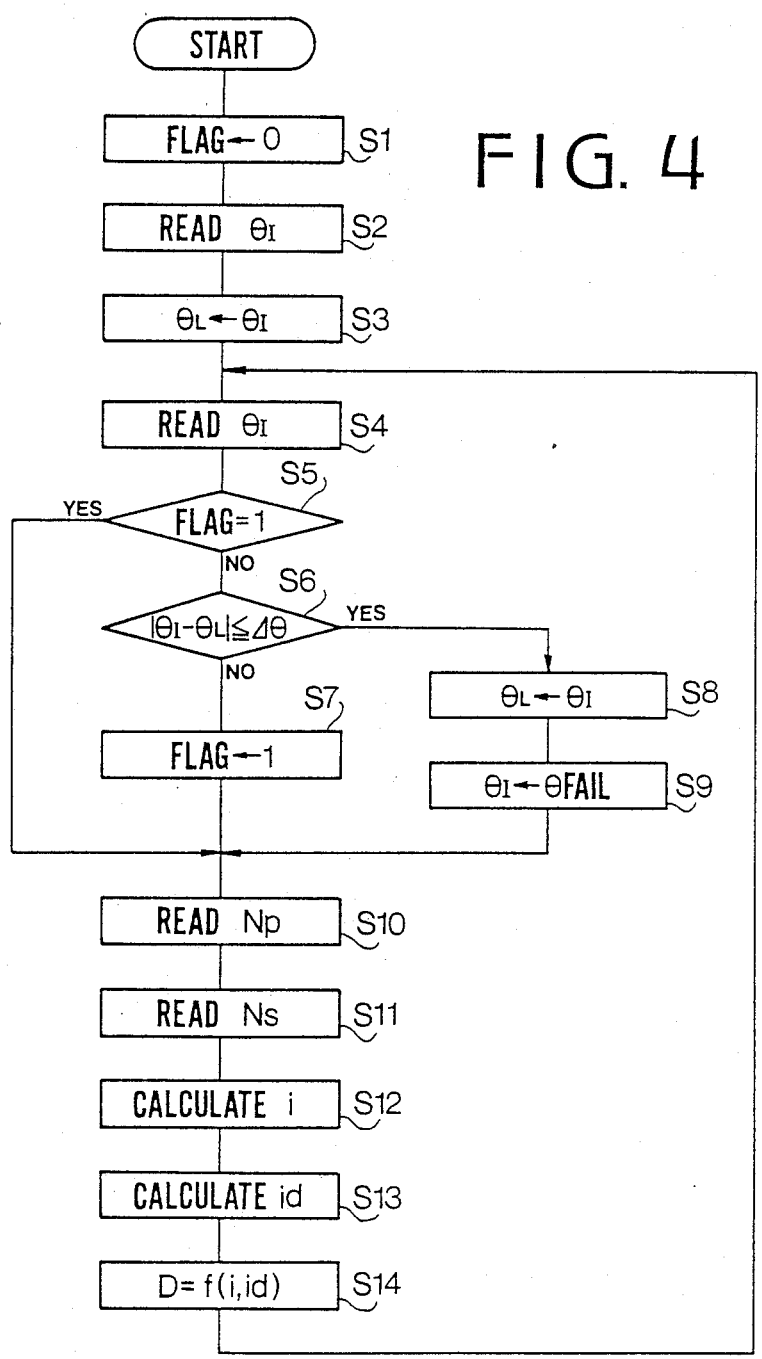
FIG. 4 is a flowchart showing the operation of the control system.
Figure 5:
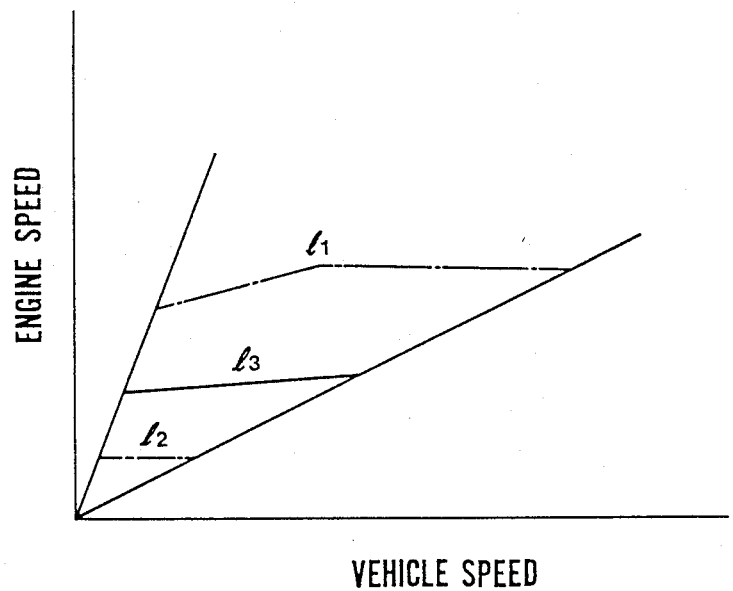
FIG. 5 is a graph showing transmission characteristics of a continuously variable transmission.

The fail-safe operation is described hereinafter with reference to FIG. 4. When the engine is started, the program starts. At a step S1, a flag for abnormality is reset to zero which means that the throttle position sensor 74 is out of order or malfunctions. Namely, at the start of the program, it is assumed that the throttle position sensor 74 is in an abnormal state regardless of the condition of the sensor 74. At a step S2, the throttle degree $\theta_I$ is read out. At a step S3, the opening degree $\theta_I$ is stored as a degree $\theta_L$ at the last loop, although the last loop does not actually exist. At a step S4, the first loop starts and the instant opening degree $\theta_I$ is read out again. At a step S5, it is determined whether the flag is set (1). At the first loop, since the flag is reset (0), the program proceeds to a step S6, where it is determined whether the difference between the instant degree $\theta_I$ and the last degree $\theta_L$ is equal to or smaller than a predetermined small value $\Delta\theta$. Since the $\theta_I$ is equal to the $\theta_L$ at the first loop, the program proceeds to a step S8, where the $\theta_I$ is stored as the $\theta_L$. At a step S9, the stored $\theta_I$ is rewritten to a fail-safe value $\theta_{FAIL}$ which represents 60% of the value at the full throttle open, as mentioned above.

Thereafter, the drive pulley speed $N_P$ and the driven pulley speed $N_S$ are read out at steps S10 and S11, and the actual transmission ratio i is calculated at a step S12. At a step S13, the desired transmission ratio id is obtained based on the driven pulley speed $N_S$ and the fail-safe value $\theta_{FAIL}$, and the duty ratio D is obtained at a step S14 in accordance with the transmission ratios i and id. Namely, immediately after the engine start, the transmission ratio is determined by the fail-safe value $\theta_{FAIL}$.

When the accelerator pedal is depressed at a subsequent loop and the throttle position sensor operates normally, the difference $|\theta_I-\theta_L|$ becomes larger than the value $\Delta\theta$. Accordingly, the program advances to a step S7, where the flag is set (1). After that the above-described operation is performed using the actual throttle position $\theta$ and the fail-safe operation no longer can occur unless the engine is restarted. If, on the other hand before the throttle position sensor operates normally with depression of the accelerator pedal, the throttle position sensor is out of order or the circuit for the sensor is grounded or a connector is disconnected by an accident, the difference $|\theta_I-\theta_L|$ is equal to or smaller than $\Delta\theta$. Accordingly, the program proceeds to steps S8 and S9 and the above mentioned fail-safe operation is performed. Thus, the transmission ratio changes along a line $l_3$ of FIG. 5 which is about middle value between $l_1$ and $l_2$. Accordingly, the vehicle can be driven at a moderate transmission ratio without reducing its driveability.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the system including a transmission ratio control valve having ports and a spool, a hydraulic circuit having a pump for supplying oil to the second hydraulic cylinder and to the first hydraulic cylinder through the transmission ratio control valve, the system comprising:

a sensor for detecting load on the engine and for producing a load signal;

first means responsive to the load signal for producing a desired transmission ratio signal;

second means responsive to the desired transmission ratio signal for shifting the spool of the transmission ratio control valve so as to provide a transmission ratio of the transmission; and a fail-safe system comprising:

third means for comparing a first load signal with a subsequent load signal and said third means produces a fail-safe signal when the difference in value between the first load signal and the subsequent load signal is smaller than a predetermined value, whereby said fail-safe system is by-passed after an indication that said sensor is functioning properly;

said first means being responsive to the fail-safe signal for producing a corrected desired transmission ratio signal so as to provide a moderate transmission ratio, instead of providing the desired transmission ratio signal corresponding to the load signals.

2. The control system according to claim 1 wherein the sensor is a throttle position sensor.

3. The control system according to claim 1 further comprising a driven pulley speed sensor for producing a driven pulley speed signal, the first means being further responsive to the driven pulley speed signal.

4. The control system according to claim 1, wherein said sensor is an intake manifold pressure sensor.

5. The control system according to claim 1, wherein the corrected desired transmission ratio signal is dependent on the fail-safe signal and vehicle speed.

6. The control system according to claim 1, wherein the fail-safe signal represents said moderate transmission ratio and has a value corresponding to about 60% of the value of said load signal at full throttle open.

7. The control system according to claim 1, wherein said control system includes a line pressure control valve for controlling line pressure of the oil supplied to the second hydraulic cylinder, said fail-safe signal includes a second fail-safe signal for controlling said line pressure control valve to control said line pressure.

8. The control system according to claim 7, wherein said second fail-safe signal has a value corresponding to 100% of a maximum torque of the engine.

9. The fail-safe system according to claim 1, wherein said engine has a throttle valve, said sensor is a throttle position sensor, and wherein said fail-safe system is by-passed after indication that said sensor is functioning properly when said throttle valve is an open condition.

10. In a control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the system including a transmission ratio control valve having ports and a spool, a hydraulic circuit having a pump for supplying oil to the second hydraulic cylinder and to the first hydraulic cylinder through the transmission ratio control valve, the system comprising:

a sensor for detecting desired load on the engine and for producing a load signal corresponding to said desired load;

first means responsive to the load signal for producing a desired transmission ratio signal corresponding to the load signal;

second means responsive to the desired transmission ratio signal for shifting the spool of the transmission ratio control valve so as to control the transmission to a transmission ratio corresponding to the desired transmission ratio signal; and a fail-safe system comprising:

third means for producing a fail-safe signal only when the load signal of the sensor remains substantially constant after an initial opening of a throttle valve, whereby said fail-safe system is by-passed after an indication that said sensor is functioning properly;

said first means being responsive to the fail-safe signal for producing a corrected desired transmission ratio signal so as to provide an intermediate transmission ratio of the transmission instead of providing the desired transmission ratio signal corresponding to the load signal.

11. The fail-safe system according to claim 8, wherein said sensor is a throttle position sensor, said fail-safe system is by-passed after indication that said sensor is functioning properly when said throttle valve is an open condition.

* * * * *